Oct. 10, 1961   R. R. BURLEY   3,003,794
LAY-IN WIREWAY STRUCTURE OR THE LIKE
Filed March 2, 1959   2 Sheets-Sheet 1

INVENTOR.
RONALD R. BURLEY
BY
Moore, White & Burd
ATTORNEYS

INVENTOR.
RONALD R. BURLEY
BY
Moore, White & Burd
ATTORNEYS

United States Patent Office 3,003,794
Patented Oct. 10, 1961

3,003,794
LAY-IN WIREWAY STRUCTURE OR THE LIKE
Ronald R. Burley, Anoka, Minn., assignor to Hoffman Engineering Corporation, Anoka, Minn., a corporation of Minnesota
Filed Mar. 2, 1959, Ser. No. 796,658
3 Claims. (Cl. 285—121)

This invention relates to new and useful improvements in wireway structure or the like in which there is provided a conduit sealed to external destructive agents yet permitting ready access to the interior thereof. In the use of electrical distribution systems for housing electrical wiring and connections, particularly in manufacturing establishments, it has long been desired to provide conduits or wireways for use in the installation of electrical wiring for machinery, in buildings, outdoors, etc. in which the conduits will permit ready access to the interior but which will when closed preclude entrance of oil, dust, dirt, water, coolant and the various chemicals and destructive agents found in various types of manufacturing establishments. The present invention is directed to providing such a conduit for electrical wiring or the like which fulfills these requisites.

It is therefore an object of this invention to provide new and useful improvements in wireway structure which will provide ready access to the wireway troughs and connections so that electrical wiring or the like can be freely laid in the troughs and connections, yet which may be tightly and securely closed to preclude admission of external destructive agents.

It is another object of this invention to provide a new and useful juncture means for wireway troughs or the like.

Still a further object of this invention is the provision of removable means for installation in a wireway trough or the like for cooperation with adjacent cover sections to provide a complete cover or closure for the wireway and preclude admission of oil, dust, dirt or the like.

Still a further object of this invention resides in the provision of a novel juncture means adapted to cooperate with adjacent sections of wireway trough structure.

Still further objects of the invention are to provide wireway structure which will permit faster installation of electric wires, cables, etc. and in which the wire can be laid in position, without being pulled through fittings or connections; which will prevent damage to electrical insulation on wires and in which the wires do not need to be pulled around sharp corners or over rough wireway surfaces; which permits fast removal of individual wires or installation of additional wiring after the wireway is installed and in which the wiring is more accessible; and which allows more convenient installation of cabled wiring as where groups of wires may be assembled separately and the entire cabled wiring assembly then laid in position in the wireway structure.

Other and further objects of the invention reside in the specific structural details of the new junction means and in their cooperation with adjacent wireway trough structure.

Still other and further objects of the invention are inherent and apparent in the structure as described, pictured and claimed.

This invention will be described with reference to the drawings in which corresponding numerals refer to the same parts and in which.

Throughout the specification and claims, the invention will be described with respect to wireway trough structure, i.e. structure in which electrical connections are to be positioned freely and then covered in destructive agent exclusion. However, it is to be understood that the structure may likewise be used for containing of various flexible conduit or conductors such as pneumatic hose, hydraulic hose or the like.

Figure 1:
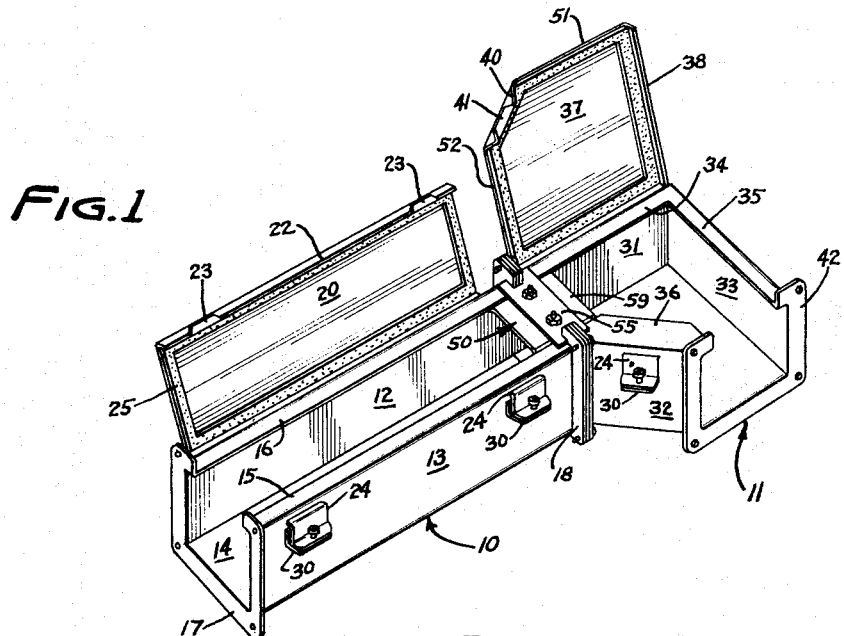
FIGURE 1 is an isometric view of wireway trough structure including the present invention.

Reference is now made to the drawings and particularly to FIGURE 1. There is shown a wireway trough generally designated 10 and secured to a wireway trough elbow generally designated 11. Trough 10 is of modified rectangular vertical cross section. Thus, it is provided with vertical walls 12 and 13 integrally joined to a bottom wall 14 and provided with top inwardly turned flanges 15 and 16. The trough and elbow are provided with terminal planar joining ends that can be secured together rigidly and here shown as comprising the walls and flanges 12-16 provided with portions turned at right angles at their ends to provide juncture flanges 17 and 18 as shown in FIGURE 1.

Extension of the trough 10 between flanges 17 and 18 may be varied as desired. As shown, the extension or length is only approximately five times the width but this may be and usually is considerably increased. As many sections or troughs 10 as necessary to make desired length may be connected by connecting the flange 18 of one to the flange 17 of an adjacent one with suitable means employed to make the joints fluid tight except at the open tops thereof, for example, a resilient, usually neoprene, gasket in between the flanges 17 and 18. Joints thus constructed and arranged provide a rigid and fluid tight seal except at the top where unobstructed access to the entire trough assembly is provided.

Figure 2:
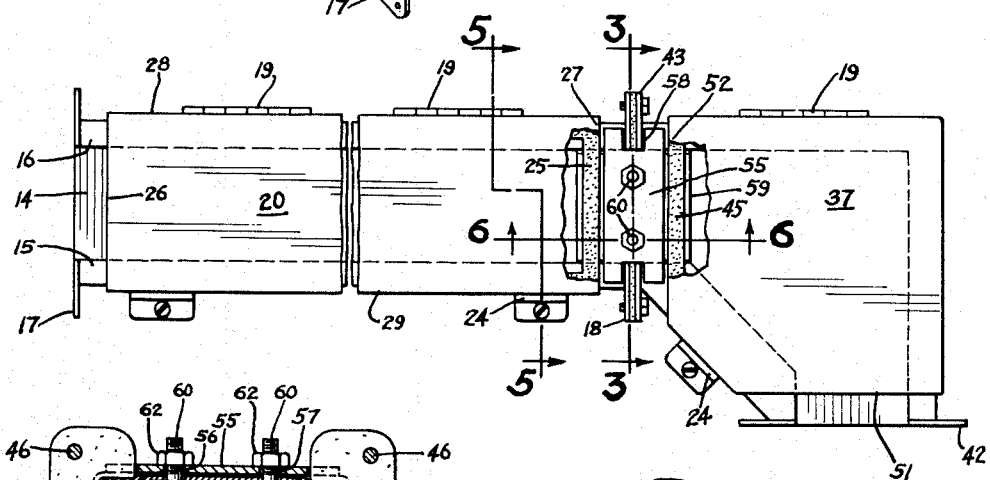
FIGURE 2 is a top plan view of the structure of FIGURE 1 on an enlarged scale.

In the illustration of FIGURE 1, the trough 10 is shown connected by flange 18 to trough elbow 11. Trough 10 is provided on the exterior of wall 12 with a plurality of hinges 19 secured to the exterior of wall 12 and also to cap or cover 20. Cover 20 is provided with a depending flange 21 to which the hinges 19 are secured and a second depending flange 22 provided with outwardly turned tabs 23 for engaging external clamps 24. The cover 20 is provided with a peripheral gasket 25 of cellular neoprene or any other suitable resilient material cemented or bonded thereto. The cover 20 is provided with edges 26 and 27 at right angles to its parallel edges 28 and 29 so that the cover top in top plan view, as shown in FIGURE 2, comprises an elongated rectangle. Edges 26 and 27 terminate inwardly of their respective flanges 17 and 18 a distance approximately equal to the inward extension of flanges 15 and 16 as shown in FIGURE 2, for a purpose subsequently to be explained.

Figure 5:
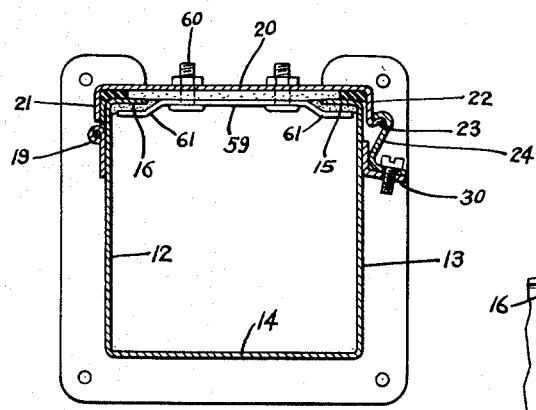
FIGURE 5 is a view taken along the line and in the direction of the arrows 5—5 of FIGURE 2.
Figure 6:
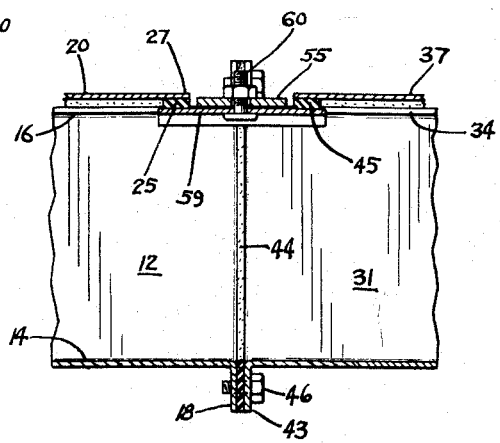
FIGURE 6 is a view taken along the line and in the direction of the arrows 6—6 of FIGURE 2.

The external clamps are secured by screws to angle brackets 30, the screws permitting extension or contraction of the position of the clamps with reference to the angle brackets 30 which are in turn secured to the wall 13, so that they may be freely moved to permit their engagement with tabs 23 as shown in FIGURE 5. Clamps 24 are loosely positioned on the screws by having an aperture slightly larger than the diameter of the threaded shank of the screw, the screw being threaded into bracket 30 so that clamp 24 has relative freedom of movement thereon. When it is desired to close the cover 20, it may be moved from the position of FIGURE 1 to the position of FIGURES 2 and 5, tabs 23 positioned under clamps 24 and the clamps drawn by tightening the screws to the position of FIGURE 5 whereupon the resilient gasket 25 in cooperation with the clamps provides a tight seal.

The 90 degree elbow to which the trough 10 is illustrated as secured, in FIGURE 1, is provided with vertical walls 31–33 having turned flanges 34 and 35 similar to either of flanges 15 or 16, except that flanges 34 and 35 extend at right angles with reference to one another. Wall 32 is provided with a polygonal flange 36 of somewhat greater inward extension.

The cap or cover 37 is provided with depending flanges 38, 39 and 40. Cover 37 is secured by hinge 19 to the exterior wall 31, similar to the securing of cover 20 to wall 12. Flange 40 is a depending corner flange having a tab 41 for engagement with clamp 24 on wall 32, as previously described with reference to tabs 23 and clamps 24 or trough 10. Elbow 11 is provided with terminal flanges 42 and 43 of identical configuration with flanges 17 and 18. Cover 37 is provided with a peripheral gasket 45 of cellular neoprene or any other suitable resilient material cemented or bonded thereto.

As shown, flanges 18 and 43 are securely bolted together by bolt assemblies 46, having a resilient gasket 44 of the same configuration as these flanges interposed.

When assembled in this fashion without juncture means 50 in position, electrical wire or the like may be very rapidly laid in position, in the trough or troughs, elbows, boxes, etc., without damage because there is no necessity for pulling wires around sharp corners. Wires can likewise be as readily removed. Individual conduits or cabled wiring can be as readily inserted or removed.

It may be mentioned at this point that the edges 51 and 52 terminate short of their respective flanges 42 and 43 a distance approximately equal to the extension of those flanges. In plan view, the top of cover 37 appears as a rectangle with one corner cut off, as shown in FIGURE 2. Because of the configuration of the cover and the angular position of wall 32, the flange 36 extends inwardly a greater distance than flanges 34 and 35 to provide the proper overlap of cover 37 over this flange, and to permit use of a symmetrical juncture means 50.

A juncture means 50 is then installed at each juncture. It comprises a flat cover plate 55 apertured at 56 and 57 to receive bolt assemblies and having bifurcated ends to provide rectangular slots 58. Slots 58 are of a width to permit entrance of two cooperating flanges as 18 and 43 with the gasket 44 interposed therebetween. They are of such depth that the bottom of the slots 58 are just clear of the inward edges of the flanges and gasket. The width of plate 55 is such as to permit only slight clearance between its edges and adjacent edges of covers 20 and 37 when in the closed position of FIGURE 2, as shown. An under plate 59 having a width approximately twice the width of member 55 is provided with apertures in which a pair of bolts 60 is positioned. The bolts are positioned so that the heads are secured in sealed relation to the underside of plate 59 and extend upwardly through the apertures therein. Plate 59 is of such length dimension as to provide slight clearance between its edges and walls 12 and 13. The edges 61 are bent downwardly on member 59 as shown in FIGURE 5 and a resilient gasket of neoprene or the like is cemented thereto to provide a top surface normally slightly higher than the top surface of member 59.

Figure 3:
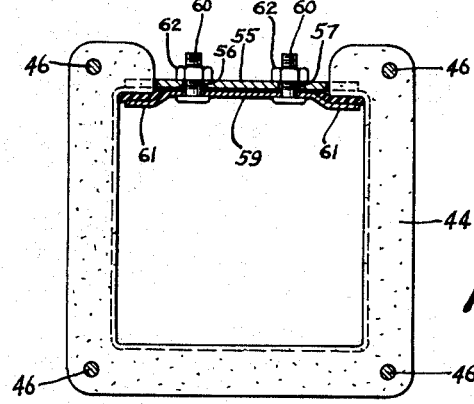
FIGURE 3 is a sectional view taken along the line and in the direction of the arrows 3—3 of FIGURE 2.
Figure 4:
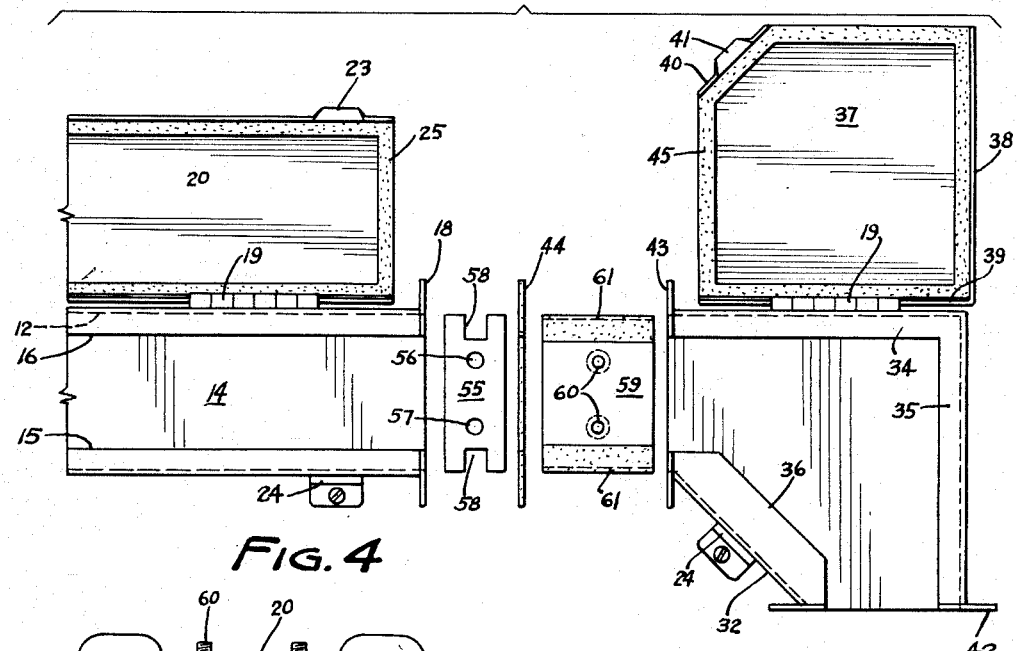
FIGURE 4 is an exploded view similar to FIGURE 2 but showing the structure in open or uncapped position.

In position the bottom plate is positioned interior of flanges 15 and 16 and 34 and 36 as shown in FIGURES 1 and 2 in which instance the gasketed edges 61 will engage the underside of these flanges, and gasket 44. The top member 55 is positioned thereon with bolts 60 extending through apertures 56 and 57, nuts 62 are then positioned thereon and drawn up tightly to force the members 55 and 59 to the position of FIGURE 3 and compress the gasket material. In this position covers 20 and 37 may then be closed from the position of FIGURE 1 to the position of FIGURE 2 and securely tightened and the gasket material at edges 27 and 52 will engage the adjacent portion of member 59 not covered by member 55 which (by virtue of the depression of edges 61) provides substantially a continuous plane surface in cooperation with adjacent portions of flanges 15 and 16, and 34 and 36.

Gaskets 25, 44, 45 and those on edges 61 may be made of any suitable resilient, destructive agent resistant material. As illustrated they are made of neoprene, but other suitable materials such as natural or synthetic rubbers, synthetic resinous material such as polyvinyl chloride, etc. may be used with in the spirit and scope of the invention. Gaskets 25, 45 and those on edges 61 are cemented or bonded to their respective cover members by any suitable cement.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A wireway trough structure or the like comprising a first trough portion having an open top and a terminal planar joining end, a second trough portion having an open top and cooperating adjacent terminal planar joining end, means forming a rigid and fluid tight joint between said ends of said adjacent trough portions, said means including sealing means positioned around said terminal ends, the open top of said trough portions being provided with inwardly turned flanges, said terminal planar joining ends and said inwardly turned flanges being so constructed and arranged that unobstructed access to the trough portions is provided through the open top thereof, a plate having downwardly off-set end portions provided with sealing gasket material for engaging the underside of said inwardly turned flanges continuously from a point on one side of the juncture of said adjacent trough portions, across the juncture to a point on the other side thereof, means secured to said plate and engaging said inwardly turned flanges for clamping the plate and flanges together releasably, said plate having exposed edge portions between said off-set ends extending transversely across said trough portions, a cover for each of said first and second trough portions shorter than the trough portions and having end edges substantially parallel to adjacent end edges of adjacent covers, sealing gasket material secured to the edges of said covers, said exposed edge portions of said plate that extend between said offset end portions lying substantially in the same plane as the inwardly turned flanges of said trough portions, and means secured to said trough portions for releasably urging said covers toward their respective inwardly turned flanges to bring said sealing gasket material into sealing engagement with said inwardly turned flanges and exposed portions of said plate.

2. The structure of claim 1 in which said means forming a rigid and fluid tight joint between said ends of adjacent trough portions consists of terminal flanges on the ends of adjacent trough portions, sealing gasket material between said terminal flanges and means for drawing said terminal flanges toward each other.

3. The structure of claim 2 in which said means secured to said plate and engaging said inwardly turned flanges comprises a second plate, narrower than said plate and having portions at the ends thereof cut away to avoid said terminal flanges.

References Cited in the file of this patent

UNITED STATES PATENTS

| | | |
|---|---|---|
| 753,714 | Krantz | Mar. 1, 1904 |
| 1,986,965 | Frank | Jan. 8, 1935 |
| 1,992,574 | Jenkins | Feb. 26, 1935 |
| 2,905,201 | McNaughton | Sept. 22, 1959 |
| 2,917,083 | Duvall et al. | Dec. 15, 1959 |
| 2,956,587 | Fisher | Oct. 18, 1960 |

FOREIGN PATENTS

| | | |
|---|---|---|
| 549,840 | Great Britain | Aug. 12, 1942 |
| 205,732 | Australia | Dec. 4, 1956 |